United States Patent [19]
Roggenburk

[11] Patent Number: 4,662,329
[45] Date of Patent: May 5, 1987

[54] ROTARY INTERNAL COMBUSTION ENGINE

[76] Inventor: Earl G. Roggenburk, Coral Key Village, R.R. #1, Box 432 D, Marathon, Fla. 33050

[21] Appl. No.: 868,599

[22] Filed: May 30, 1986

[51] Int. Cl.$^4$ ............................................ F02B 53/04
[52] U.S. Cl. .................................... 123/236; 123/235
[58] Field of Search ....................... 123/227, 235, 236

[56] References Cited
U.S. PATENT DOCUMENTS

1,970,004  8/1934  Friedell ............................ 123/236 X
2,100,267 11/1937  Potthast ........................... 123/235 X
3,152,582 10/1964  Larcher, Sr. et al. ............... 123/235

Primary Examiner—Stephen F. Husar
Attorney, Agent, or Firm—Pearne, Gordon, McCoy & Granger

[57] ABSTRACT

A rotary internal combustion engine is disclosed in which radially mounted pistons are used to provide compression and ignition, and expansion occurs in a separate rotor having hollow vanes which are driven during the expansion portion of the cycle. The vanes utilize a moment arm which is very large producing a large torque output.

10 Claims, 9 Drawing Figures

ROTARY INTERNAL COMBUSTION ENGINE

BACKGROUND OF THE INVENTION

1. Field of the Invention

This invention relates to an internal composition engine in which the engine rotates with the shaft, and more particularly, to an engine which uses a vane rotor to produce the power output.

2. Description of the Prior Art

Conventional rotary internal combustion engines have been formed of a plurality of reciprocating pistons each of which reciprocates in a radial direction with respect to the output shaft. Each of these pistons operate in a manner similar to the reciprocating pistons of an in-line internal combustion engine. The compression, firing and expansion portions of the engine cycle are all performed within the piston cylinders.

Other rotary internal combustion engines depend upon eccentrically mounted rotors, with the compression, ignition and expansion occurring at different cycles of the rotation of the rotor. While such engines have an advantage of increased torque, the expansion and exhaust cycle of the engine is relatively short so that some of the power which can be recovered from the expanded gases is lost.

SUMMARY OF THE INVENTION

The present invention provides advantages over prior art rotary internal combustion engines and other advantages which have not been obtained previously. The engine of the present invention uses radially extending vanes to define expansion chambers in which the ignited air-fuel mixture expands to drive the engine. Using the engine of the present invention, it is possible to obtain a relatively large torque because the moment arm upon which the force of the expanding gases acts is almost as large as the radius of the engine. Thus, the maximum moment arm is achieved and the torque output is maximized.

Unlike rotary internal combustion engines of the prior art having eccentrically mounted rotors, the engine of the present invention has a relatively long expansion cycle so that the maximum amount of power is derived from the expanding gases. The engine of the present invention uses a cycle equal to approximately one-half rotation of the shaft because the compression portion of the cycle is achieved in other sections of the engine.

These and other advantages are achieved by the rotary internal combustion engine of the present invention. The engine comprises a nonrotatable housing and means for supplying a combustion mixture. A rotatable shaft is journalled within the housing. The engine comprises a compression portion rotatable with the shaft. The compression portion comprises a first rotor mounted on the shaft and having a plurality of cylinders and a plurality of pistons each of which reciprocates within one of the cylinders to compress the mixture. The engine also comprises an ignition and expansion portion rotatable with the shaft. The ignition and expansion portion comprises a second rotor mounted on the shaft and a plurality of hollow vanes adapted to extend from the second rotor. The second rotor has a plurality of ignition chambers each connected to receive the compressed mixture from one of the cylinders. A plurality of expansion chambers are formed around the second rotor, each connected to receive the ignited mixture from one of the ignition chambers. The expansion chambers are separated by the vanes.

DETAILED DESCRIPTION OF THE PREFERRED EMBODIMENT

Figure 1:
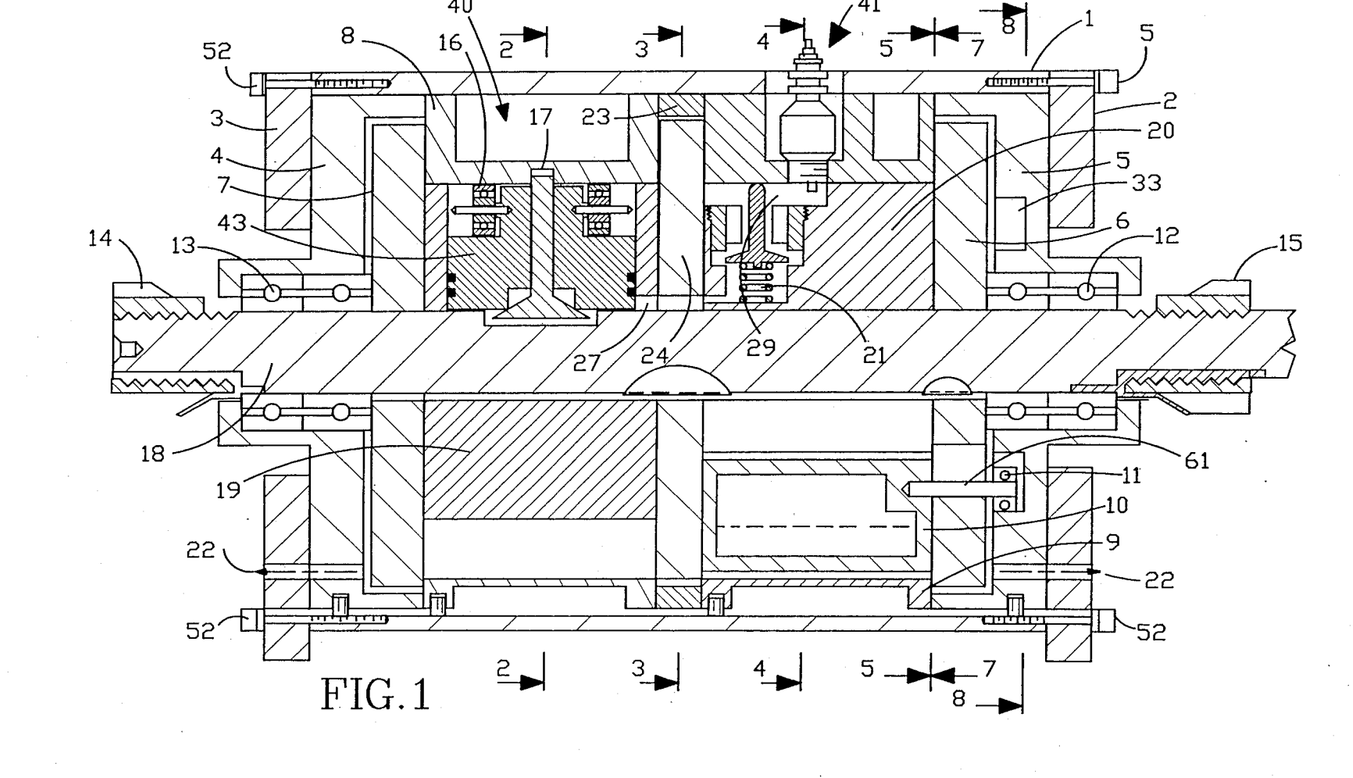
FIG. 1 is a side sectional view of the engine of the present invention.

Referring more particularly to the drawings, FIG. 1 shows the rotary internal combustion engine of the present invention. The engine is contained in a cylindrical housing 1 to which annular end caps 2 and 3 are attached at each end by means of bolts 52. Positioned within each of the end caps 2 or 3 is a bearing housing 4 or 5. The bearing housing 4 is positioned adjacent the front end cap 3, and the bearing housing 5 is positioned adjacent the rear end cap 2.

A pair of flushed faced thrust bearings 12 or 13 are located at each end of the engine within each of the bearing housings 4 and 5. Inside each of the bearing housing 4 or 5 adjacent to one of the bearings 12 or 13 is a rotating end plate 6 or 7 which is mounted for rotation with a rotor shaft 18. Each of the end plates 6 and 7 is provided with a central opening through which the rotor shaft 18 extends. The rotating end plate 6 is positioned adjacent to the rear bearing housing 5 and the rear bearings 12, and the rotating end plate 7 is positioned adjacent to the front bearing housing 4 and the front bearings 13. The rear pair of bearings 12 are thus retained by the rear bearing housing 5 and the rear end plate 6, and the front pair of bearings 13 are retained by the front bearing housing 4 and the front end plate 7.

To hold the engine in place on the rotor shaft, the rotor shaft 18 has a lock nut/washer nut combination 14 or 15 located at each end. The lock nut/washer nut combination 14 is at the front end of the rotor shaft 18, and the lock nut/washer nut combination is at the rear end of the rotor shaft. A clearance is provided between each of the rotating end plates 6 and 7 and the adjacent bearing housing 4 or 5. A vent 22 is provided through each of the bearing housings 4 and 5 and through the adjacent end caps 2 and 3 so that combustion pressure contained in these clearances can be vented.

The engine comprises a compression portion 40 and an ignition and expansion portion 41. The compression portion 40 is separated from the ignition and expansion portion 41 by a rotating valve port plate 24 mounted on the rotor shaft 18 approximately midway between the rotating end plates 6 and 7. The outer diameter of the rotating valve port plate 24 is less than the inner diameter of the cylindrical housing 1, so that a nonrotating annular spacer 23 is provided around the plate 24. The compression portion 40 of the engine is thus located between the rotating front end plate 6 and the rotating valve port plate 24, and the ignition and expansion portion 41 of the engine is located between the rotating valve port plate 24 and the rotating rear end plate 6.

Figure 2:
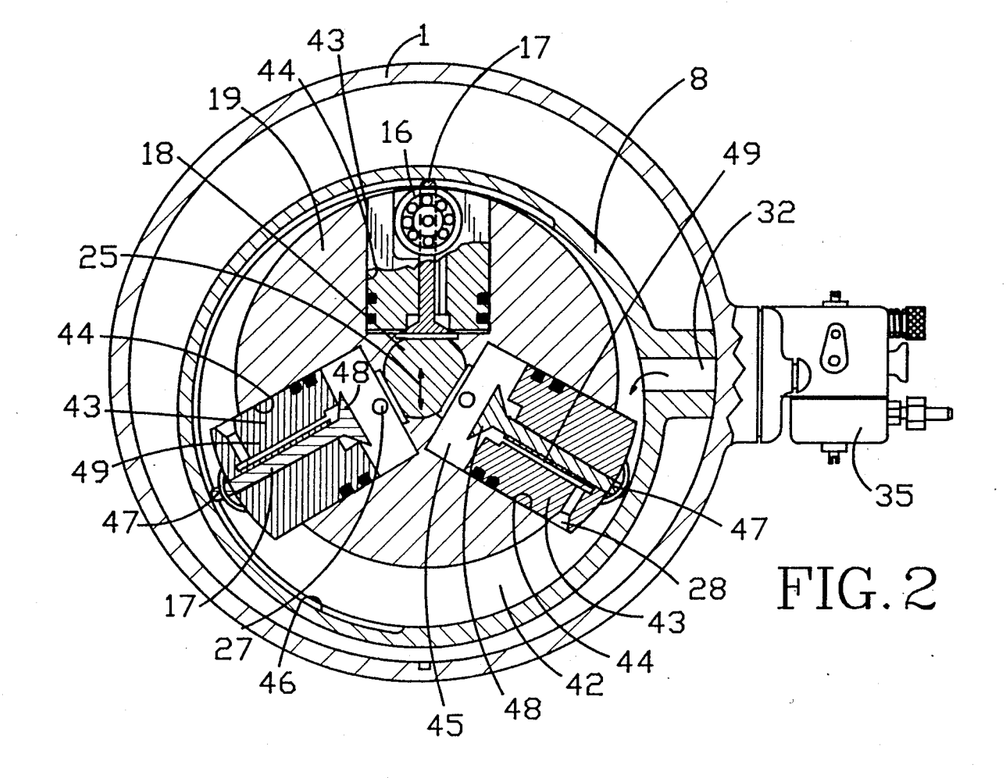
FIG. 2 is an end sectional view taken along line 2—2 of FIG. 1.

The compression portion 40 of the engine is shown in FIGS. 1 and 2. As shown in FIG. 1, an eccentric cylinder liner 8 is positioned between the rotating front end plate 7 and the rotating valve port plate 24 adjacent to the cylindrical housing 1. The liner 8 is fixedly attached to the housing 1 and thus does not rotate. As shown in FIG. 2, the liner 8 is eccentrically positioned with respect to the shaft 18 so that a clearance is provided within the liner adjacent to the inside of the housing 1. Within the eccentric cylinder liner 8 is a cylindrical rotor 19 which is mounted for rotation on the shaft 18. Due to the eccentricity of the position of the cylinder liner 8, an outer compression chamber 42 is provided between the inside of the liner 8 and the outside of the rotor 19. Because of the eccentric position of the cylinder liner 8 with respect to the rotor 19, this outer compression chamber 42 varies in dimensions forming a relatively large chamber at the bottom of the engine as shown in FIG. 2 and forming essentially no chamber at all at the top of the engine as shown in FIG. 2.

Within the rotor 19 are three cylindrical pistons 43 extending radially with respect to the rotor shaft 18. Each of the pistons is mounted for reciprocal movement within corresponding piston cylinders 44 extending radially within the rotor 19. Each of the pistons 43 has a passage 49 extending radially (with respect to the shaft 18) through the central portion of the piston. The passage 49 is connected to the chamber 42 formed between the liner 8 and the rotor 19 by a port 28 extending through the side of the piston 43 in the direction in which the rotor 19 is rotating. The radially inward end of the passage 49 is closed by the head 48 of an intake valve 17. The intake valve 17 is located within the center of the piston 43 and extends coaxial with the piston. Each piston 43 is capable of moving radially within its piston cylinder 44 in the rotor 19. In addition, each intake valve 17 is capable of moving within its piston 43. Each piston 43 rides on the inside of the cylinder liner 8 by means of a pair of ball bearings 16 (FIGS. 1 and 2) which engage the inner surface of the cylinder liner 8. Because of the eccentric position of the liner 8, the pistons reciprocate with the cylinders as the rotor 19 rotates. Centrifugal force urges each piston radially outwardly as the piston moves toward the bottom of the engine as shown in FIG. 2, and the engagement of the piston with the inner surface of the liner 8 urges each piston radially inwardly as the piston moves toward the top of the engine as shown in FIG. 2. When each piston is in its radially outward position an inner compression chamber 45 is created within the piston cylinder adjacent to the rotor shaft 18. When the piston moves to its radially inward position, the piston moves into the compression chamber and the chamber contacts until no chamber exists.

The inside of the cylinder liner 8 is also provided with a groove 46 extending around a portion of the inner circumference of the liner. The stem 47 of each of the intake valves 17 engages the groove as the piston rotor 19 rotates within the cylinder liner 8. When the stem 47 of one of the intake valve 17 engages the groove 46, the valve 17 moves radially outwardly with respect to the piston 43 closing the opening at the valve head 48. Along the portion of the inner surface of the cylinder liner 8 in which the groove 46 is not present, the intake valve 17 is pushed radially inwardly with respect to the piston 43, opening the valve and permitting air-fuel mixture to enter the inner compression chamber 45.

Air-fuel mixture is provided to the outer compression chamber 42 by means of a carburetor 35 mounted on the outside of the housing 1. Air fuel mixture from the carburetor 35 is provided to an intake fuel mixture port 32 which connects to the outer compression chamber 42 between the rotor 19 and the cylinder liner 8. This air-fuel mixture enters each of the inner compression chambers 45 through the passage 49 within the piston 43 associated with the inner chamber. The air-fuel mixture enters the passage 49 through the rotating super charging port 28 which extends through the side of the piston 43 in the direction of movement of the rotor 19. Due to rotation of the rotor 19 and associated rotation of all of the pistons 43 through the outer compression chamber 42, the rotational movement provides a supercharging effect as the air-fuel mixture in the outer chamber is forced into the port 28. The air-fuel mixture travels through the passage 49 in each of the pistons 43 and enters the inner compression chamber 45 as long as the intake valve 17 is pushed radially inwardly by contact of the valve stem 47 with the inner surface of the liner 8. When the stem 47 of the intake valve 17 engages the groove 46 in the liner 8, the intake valve 17 closes stopping any further flow of air-fuel mixture into the inner compression chamber 45.

As each piston 43 passes the intake fuel mixture port 32, the piston is moving radially outwardly due to the eccentric position of the liner 8, and the intake valve 17 is open due to the absence of the groove 46 in the inner surface of the liner. Air-fuel mixture is forced into the port 28, through the passage 49, and into the expanding inner chamber 45. When the piston 43 reaches the bottom of the engine, as shown in FIG. 2, the piston stops moving radially outwardly and begins moving radially inwardly; the inner chamber 45 stops expanding and begins contracting; and the groove 46 begins in the inner surface of the liner 8, closing the intake valve 17, and stopping the flow of air-fuel mixture in or out of the inner chamber 45. As the rotor 19 continues to rotate toward the top of the engine as shown in the drawings, the piston 43 is pushed radially inwardly, contracting the inner chamber 45, and compressing the air-fuel mixture within the inner chamber.

Figure 3:
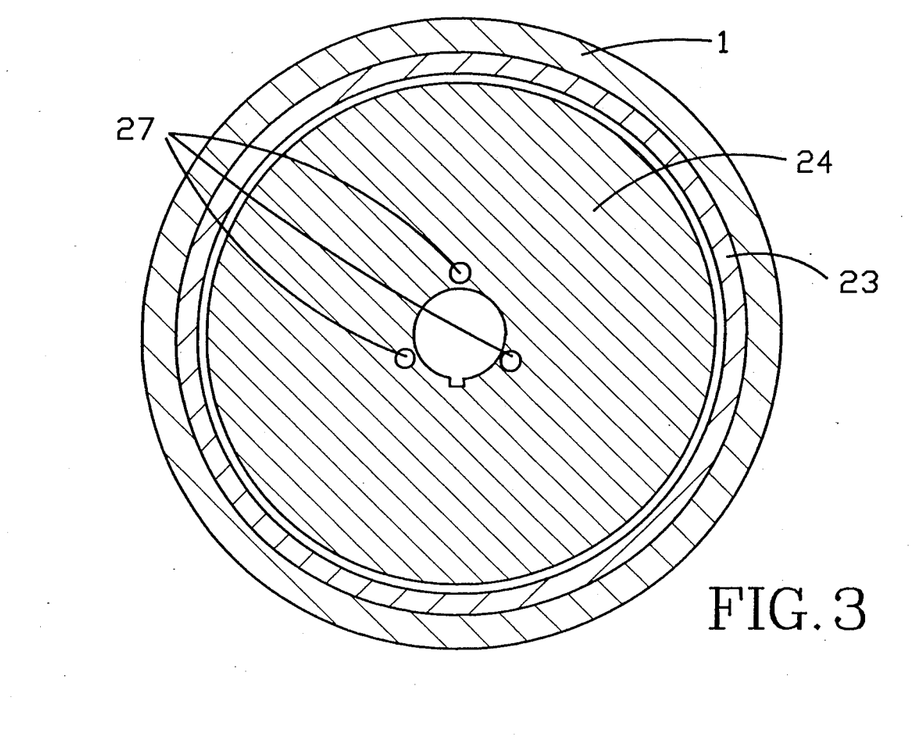
FIG. 3 is an end sectional view taken along line 3—3 of FIG. 1.

The compressed air-fuel mixture travels from the inner compression chamber 45 to the ignition and expansion portion 41 of the engine through ports 27 (FIGS. 1-3). There are three of the ports 27, one port is associated with each of the inner chambers 45. As shown in FIG. 1, the ports 27 extend through one side of the piston rotor 19 and through the rotating valve port plate 24 which divides the compression portion 40 of the engine from the ignition and expansion portion 41 of the engine.

Figure 4:
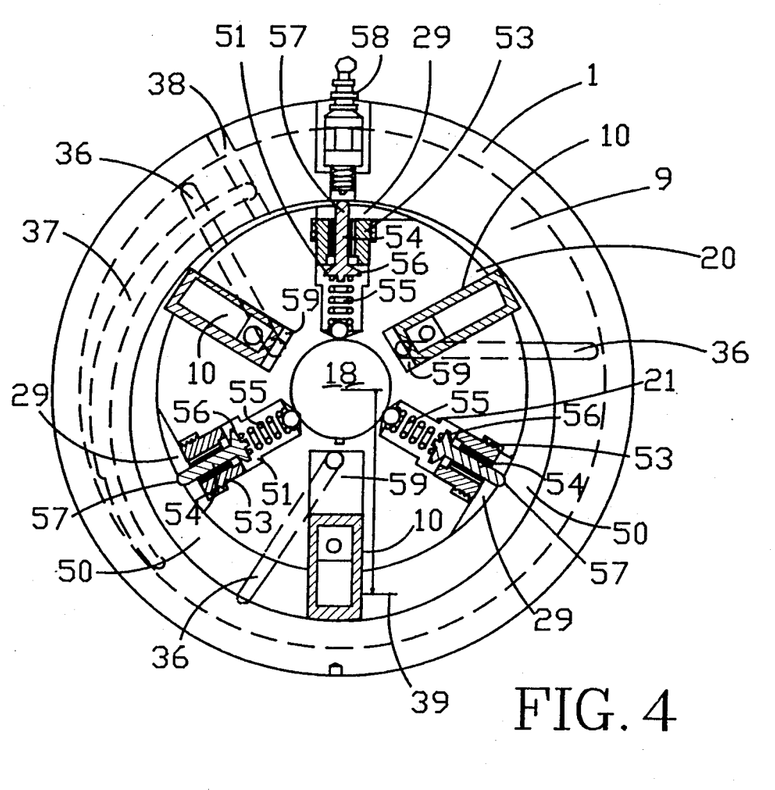
FIG. 4 is an end sectional view taken along line 4—4 of FIG. 1.

The ignition and compression portion of the engine includes the vane rotor 20 which is mounted for rotation on the rotor shaft 18 and located between the valve port plate 24 and the rotating rear end plate 6. The vane rotor 20 rotates within a vane eccentric cylinder liner 9 which surrounds the vane rotor 20. As shown in FIG. 4, the vane eccentric cylinder liner 9 is mounted eccentrically about the rotor shaft 18 so that an expansion chamber 50 of varying dimension is provided between the outside of the vane rotor 20 and the interior of the cylinder liner 9.

The compressed air-fuel mixture from each of the ports 27 enters one of three corresponding radially extending passages 51 in the vane rotor 20. Each of the passages 51 in the vane rotor 20 extends parallel to one of the piston cylinders 44 in the piston rotor 19. At the radially outward end of each of the passages 51 is a small ignition chamber 29 formed as a small indentation in the outer surface of the vane rotor 20. In each of these passages 51 is a vane valve and spring assembly 21. Each vane valve and spring assembly 21 comprises an annular valve seat 53 threaded into the radially outward end of the passage 51, a valve 54 having a stem 57 which extends through the center of the annular seat 53, and a spring 55 which is located in the radially inward portion of the passage 51 and which engages the head 56 of the valve 54 to force the valve head against the seat to close the valve. When the vane valve 54 is closed under action of the spring 55, it prevents the air-fuel mixture from flowing radially outwardly through the passage 51. The stem 57 of each of the valves 54 extends beyond the outer surface of vane rotor 20 to engage the inner periphery of the cylinder liner 9 when the valve is at the top of the engine adjacent to a spark plug 58 mounted in the liner 9. When the valve stem 57 engages the inner surface of the cylinder liner 9, the valve 54 is forced open in opposition to the spring 55 to permit the air-fuel mixture from the port 27 to flow through the passage 51 and enter the ignition chamber 29. This occurs when the ignition chamber 29 is at the top of the engine as shown in FIG. 4. The ignition chamber 29 is thus positioned at the spark plug 58, and the spark plug fires.

After the air-fuel mixture ignites within the ignition chamber 29, the vane rotor 20 rotates (clockwise as shown in FIG. 4) the air-fuel mixture enters the expansion chamber 50 directly behind one of three lightweight hollow vanes 10. Each of the vanes 10 is mounted for sliding radial movement into and out of a corresponding cavity 59 in the vane rotor 20. Each of the vanes 10 is mounted so that the end of the vane is constantly in engagement with the inner periphery of the cylinder liner 9. An expansion chamber 50 is thus formed behind the vane 10 and between the vane rotor 20 and the liner 9, and the burning air-fuel mixture expands after ignition to push the vane and drive the engine.

As shown in FIG. 4, the torque produced in each expansion chamber 50 is equal to the force exerted on the surface of the vane 10 times the moment arm at which this force is exerted. This moment arm, identified as 39 in FIG. 4, is the distance from the center of the rotor shaft 18 to the exposed surface of the vane 10. Because this moment arm is almost as large as the radius of the motor itself, the motor of the present invention is capable of producing more torque than conventional rotary engines of the same size. In a conventional rotary engine, the moment arm is only as long as the length of the stroke of the reciprocating piston. By using the vanes 10, the engine of the present invention can produce more torque in the same space.

Figure 5:
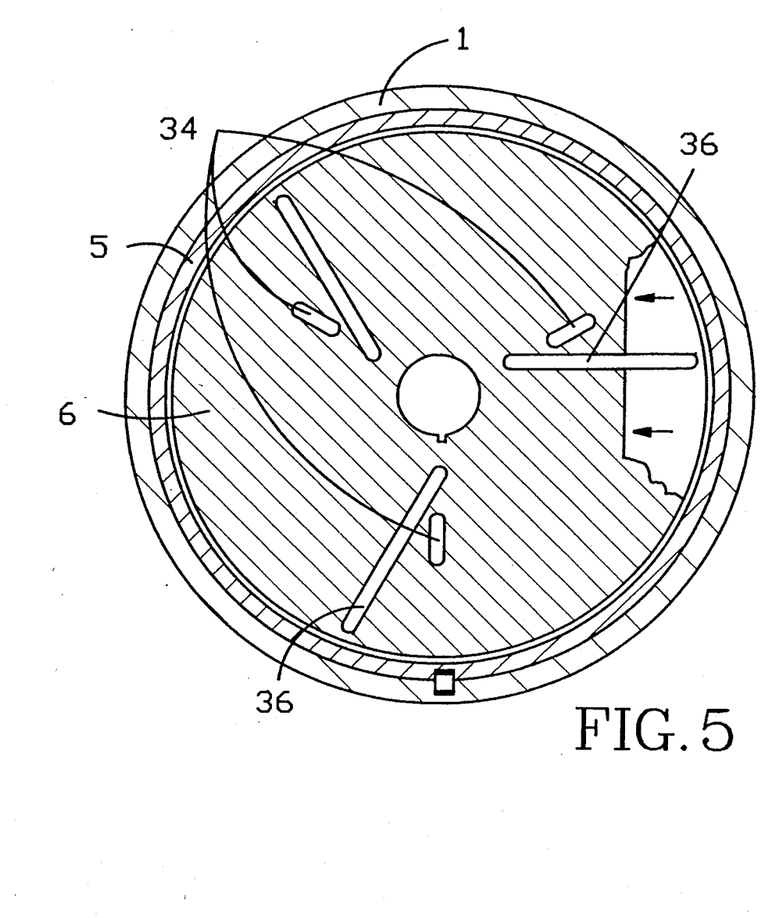
FIG. 5 is an end sectional view taken along line 5—5 of FIG. 1.
Figure 6:
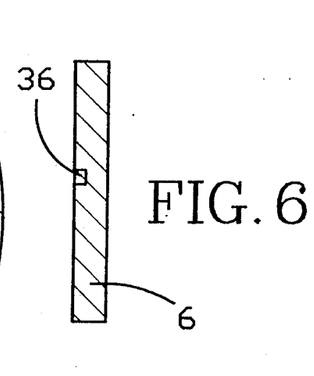
FIG. 6 is a front sectional view taken along line 6—6 of FIG. 5.
Figures 7, 9:
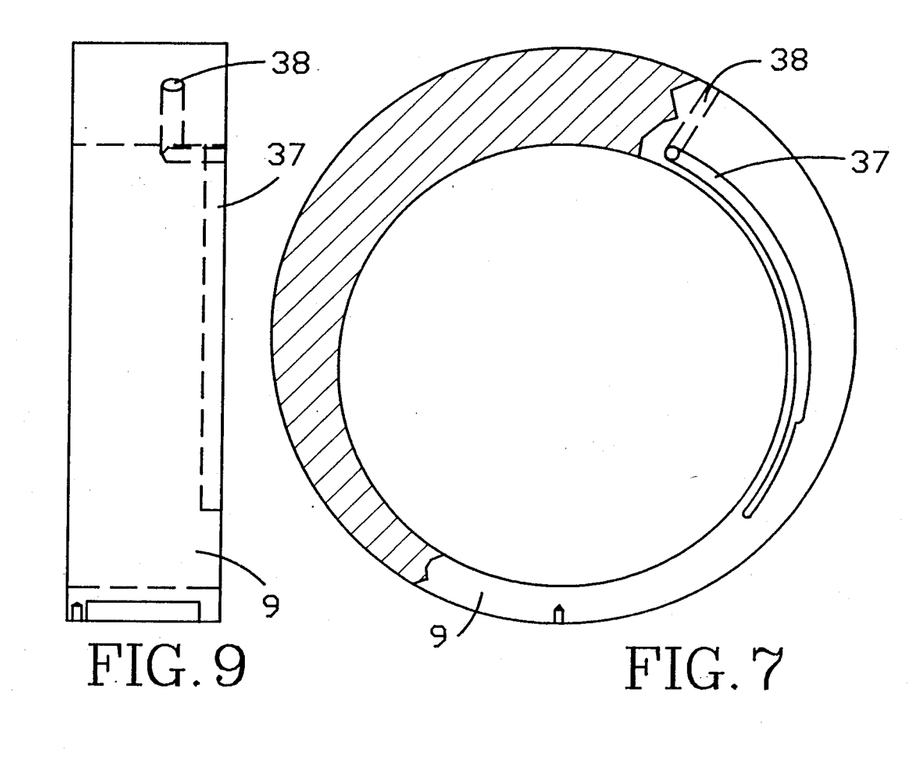
FIG. 7 is an end view of the vane rotor from the opposite direction of FIG. 5 partially in section taken along line 7—7 of FIG. 1.
FIG. 9 is a side elevational view of the vane rotor of FIG. 7.
Figure 8:
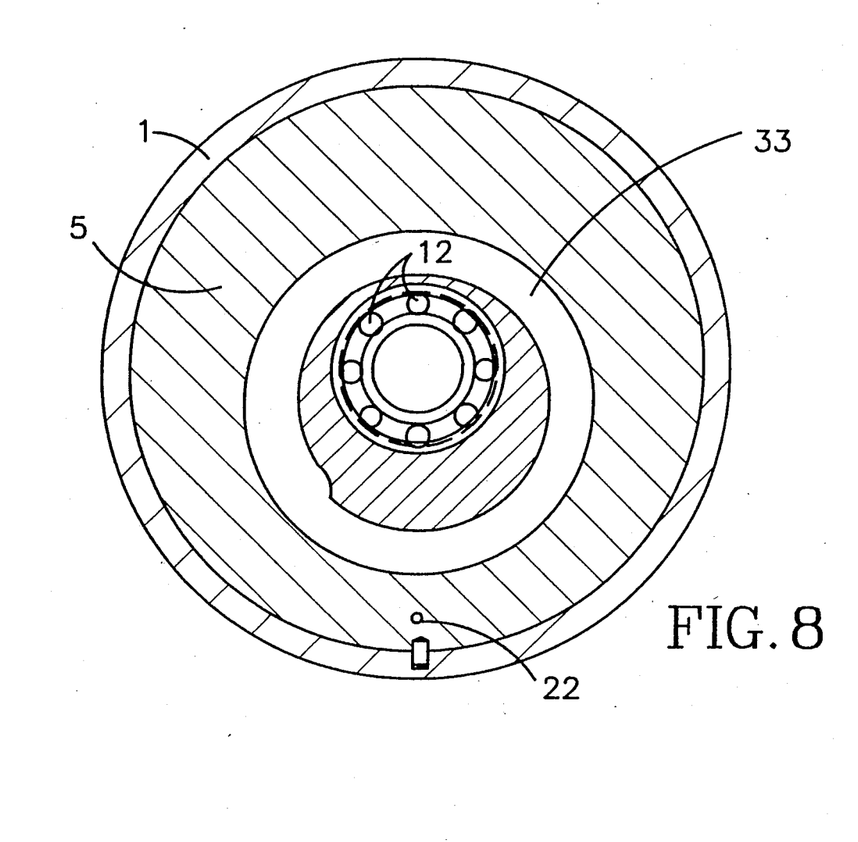
FIG. 8 is an end sectional view taken along line 8—8 of FIG. 1.

Due to the eccentric position of the liner 9, the expansion chamber 50 behind the vane 10 increases in size as the vane rotor 20 rotates and the vane moves toward the bottom of the engine as shown in FIG. 4. After the mixture reaches full expansion, it is exhausted through exhaust ports 36, 37 and 38. As shown in FIGS. 5 and 6, the rotating exhaust port 36 is provided by a radially extending groove formed in the rear end plate 6. As the vane rotor 20 rotates and the expansion chamber 50 begins to contract due to the eccentricity of the liner 9, the port 36 forms a connection between the expansion chamber 50 and the circumferentially extending exhaust port 37. As shown in FIG. 7, the exhaust port 37 is formed by means of a circumferentially extending groove in the side of the vane eccentric cylinder liner 9. The radially extending port 36 forms a connection between the expansion chamber 50 and the circumferential extending port 37 (FIG. 4) which allows the exhaust from the expansion chamber to enter the port 37. The exhaust port 37 is located on the side of the engine in which the expansion chamber 50 is contracting so that exhaust is only provided during when the expansion chamber is being emptied. The port 37 is connected to a radially extending exhaust port 38 (FIGS. 4, 7, 8) which extends through the cylinder liner 9 and allows the exhaust to be vented to the atmosphere.

To reduce the friction as each of the vanes 10 retract into its corresponding cavity 59, each cavity 59 is also exhausted by means of the exhaust port 36. As shown in FIG. 4, each of the exhaust ports 36 connects with one of the vane cavities 59 at the inward end of the port 36. When the vane rotor 20 reaches the position in which the exhaust port 36 is connected to the exhaust port 37, the vane cavity 59 is connected to this exhaust system. The reduced pressure of the exhaust gases from the expansion chamber 50 flowing through the exhaust ports draws the gas out of the cavity 59, pulling the hollow vane 10 back into the cavity during the exhaust cycle.

Each of the hollow vanes 10 may also be supported for movement by a truncheon assembly which engages the rear bearing housing 5. A truncheon 61 may be attached to each of the vanes 10 and projects rearwardly into radially extending grooves 34 (FIGS. 1 and 5) formed in the rotating end plate 6. The slots 34 are enlarged in the radial direction due to the radial movement of each of the vanes 10 as the vane rotor 20 rotates. On the end of the truncheons are bearings 11 which engage a corresponding eccentrically positioned raceway 33 formed on the inner surface of the rear bearing housing 5. As the vane rotor 20 rotates with the shaft 18, the bearings 11 rotate in the raceway 33 to support the rotating hollow vanes 10. The eccentricity of the raceway 33 assures that each of the vanes 10 will move radially in and out as the vane rotor 20 rotates, so that the outer end of each vane will remain in contact with the inner surface of the liner 9.

To increase the power of the motor of the present invention with a minimal increase in the size of the motor, it is possible to provide two compression portions, one on each side of the firing and expansion portion. The two compression portions would be mounted on the same rotor shaft with the firing and expansion portion in between. Each compression portion would be comprised of a plurality of cylinders as already described. The vanes in the firing and expansion portion may be made wider to accommodate the increased air-fuel mixture.

The compression portion has been shown with three cylinders and, correspondingly, the firing and expansion portion has been shown with three vanes. However, a different number of elements is possible. For example, six cylinders and six vanes may be provided if the engine is sufficiently large enough to accommodate them.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A rotary internal combustion engine, which comprises:
    a nonrotatable housing;
    means for supplying a combustion mixture;
    a rotatable shaft journalled within the housing;
    a compression portion rotatable with the shaft, the compression portion comprising a first rotor mounted on the shaft and having a plurality of cylinders and a plurality of pistons, each of the pistons reciprocating within one of the cylinders to compress the mixture; and
    an ignition and expansion portion rotatable with the shaft, the ignition and expansion portion comprising a second rotor mounted on the shaft and a plurality of hollow vanes adapted to extend from the second rotor, the second rotor having a plurality of ignition chambers each connected to receive the compressed mixture from one of the cylinders, a plurality of expansion chambers being formed around the second rotor, each connected to receive the ignited mixture from one of the ignition chambers, the expansion chambers being separated by the vanes.

2. A rotary internal combustion engine as defined in claim 1, wherein the second rotor is mounted within an eccentrically mounted liner whereby the expansion chamber surrounding the second rotor varies in dimension as the rotor rotates with the shaft.

3. A rotary internal combustion engine as defined in claim 2, wherein the vanes are movable radially with respect to the rotor to move radially outwardly into the expansion chamber during the portion of the cycle in which the expansion chamber is enlarged and retracting into the rotor during the portion of the cycle in which the expansion chamber is smaller.

4. A rotary internal combustion engine as defined in claim 1, wherein a compression supply chamber is formed around the first rotor, and the first rotor is mounted within an eccentrically mounted liner whereby the supply compression chamber surrounding the first rotor varies in dimension as the rotor rotates with the shaft.

5. A rotary internal combustion engine as defined in claim 4, wherein supercharging ports are provided on the first rotor through which mixture travels from the compression supply chamber to the cylinder.

6. A rotary combustion engine as defined in claim 1, wherein the cylinders extend radially with respect to the shaft.

7. A rotary internal combustion engine as defined in claim 1, comprising in addition means for exhausting the expended mixture from the expansion chambers.

8. A rotary internal combustion engine as defined in claim 1, wherein the ignition and the expansion portion comprises in addition a plurality of valve means each associated with one of the cylinders and one of the ignition chambers, each of the valve means closing when the cylinder is compressing the mixture and opening after compression to admit the mixture to the ignition chamber.

9. A rotary internal combustion engine as defined in claim 1, wherein the ignition chamber comprises an indentation on the periphery of the second rotor.

10. A rotary internal combustion engine, which comprises:
    a nonrotatable housing;
    carburetor means for supplying an air-fuel mixture;
    a rotatable shaft journalled within the housing;
    a compression portion rotatable with the shaft, the compression portion comprising a first rotor mounted on the shaft having a plurality of cylinders extending radially with respect to the shaft and a plurality of pistons each reciprocating within one of the cylinders to compress the air-fuel mixture, the compression portion also comprising a first liner eccentrically mounted within the housing around the first rotor, the compression supply chamber being formed between the first rotor and the first liner, the compression supply chamber having a variable dimension around the rotor due to the eccentricity of the liner;
    an ignition and expansion portion rotatable with the shaft, the ignition and expansion portion comprising a second rotor mounted on the shaft and a plurality of hollow vanes adapted to extend from the second rotor, the ignition and expansion portion also comprising a second liner mounted within the housing eccentrically with respect to the rotor, the second rotor having a plurality of ignition chambers each connected to receive the compressed air-fuel mixture from one of the cylinders, a plurality of expansion chambers being formed around the second rotor and within the second liner, each of the expansion chambers connected to receive the ignited air-fuel mixture from one of the ignition chambers, the expansion chambers varying in dimension around the periphery of the rotor due to the eccentricity of the liner, the expansion chamber being separated by the vanes, the expanding air-fuel mixture in the expansion chamber causing the vanes to rotate and drive the engine; and means for exhausting the expended air-fuel mixture.

* * * * *